Figure 1:
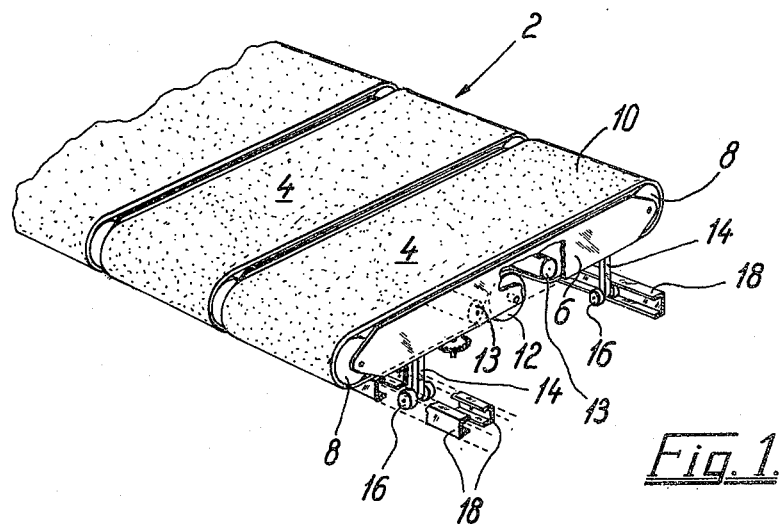

United States Patent [19]
Nielsen

[11] 3,912,071
[45] Oct. 14, 1975

[54] CONVEYOR SYSTEM HAVING SELECTIVE LATERAL DELIVERY

[75] Inventor: Jacob August Nielsen, Viby J., Denmark

[73] Assignee: Crisplant A/S, Denmark

[22] Filed: Sept. 3, 1974

[21] Appl. No.: 502,879

Related U.S. Application Data
[63] Continuation of Ser. No. 336,827, Feb. 28, 1973, abandoned.

[30] Foreign Application Priority Data
Feb. 29, 1972 United Kingdom.................. 9351/72

[52] U.S. Cl.................................. 198/38; 198/185
[51] Int. Cl.² ......................................... B65G 47/46
[58] Field of Search ............ 198/38, 144, 181, 185, 198/203; 214/11

[56] References Cited
UNITED STATES PATENTS

| | | |
|---|---|---|
| 1,138,100 | 5/1915 | Gale, Jr. ............................. 198/38 |
| 3,231,068 | 1/1966 | Harrison et al. ..................... 198/185 |
| 3,550,748 | 12/1970 | Hauer .................................. 198/38 |
| 3,786,910 | 1/1974 | Wallis.............................. 198/38 X |

*Primary Examiner*—Evon C. Blunk
*Assistant Examiner*—Richard K. Thomson
*Attorney, Agent, or Firm*—Craig & Antonelli

[57] ABSTRACT

A conveyor, especially a sorting conveyor, comprising an endless main conveyor belt made as a train of consecutive belt links each constituted by a conveyor element having transversely arranged endless conveyor belt means operable to be moved in the cross direction of said main conveyor belt in order to effect unloading of articles from the main conveyor selectively at one of a plurality of unloading stations passed by the main conveyor belt, said cross conveyor belt means being driven by driving means located individually on each conveyor element and having a power transfer device such as a pinion adapted to be operated by moving engagement with elongated actuator means such as tooth racks associated with the chassis of the main conveyor, wherein the driving connection between the actuator means and the cross conveyor belt means of each conveyor element is provided with a coupling means operable to be shifted between a power transferring position and a disengaged position, and wherein adjacent each unloading station there is provided a coupling actuator which is selectively shiftable between an active position, in which when passed by a cross conveyor element it causes said coupling means of the elements to be brought into said power transferring position, and an inactive position in which it allows the coupling means of the passing elements to remain in their disengaged positions, deactuation means being provided after each or after all unloading stations for shifting the actuated couplings back to their disengaged positions.

23 Claims, 9 Drawing Figures

U.S. Patent    Oct. 14, 1975    Sheet 1 of 3    3,912,071

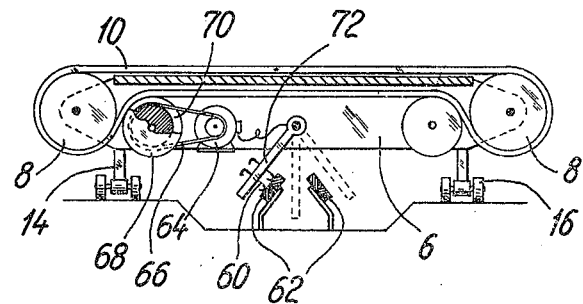
_Fig.7._
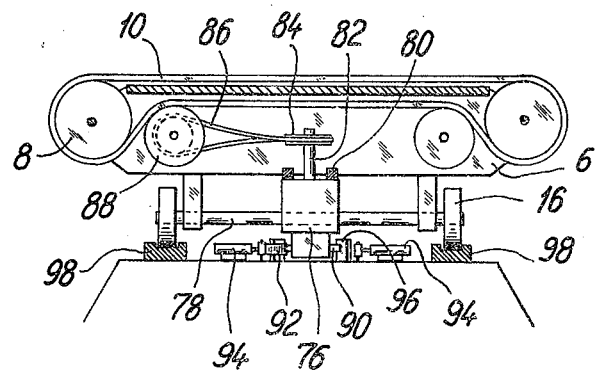
_Fig.8._
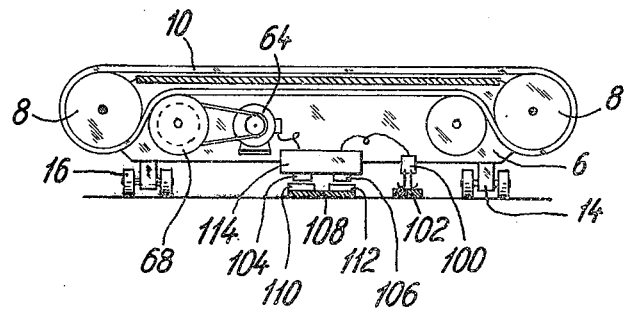
_Fig.9._

CONVEYOR SYSTEM HAVING SELECTIVE LATERAL DELIVERY

This is a continuation of application Ser. No. 336,827, filed Feb. 28, 1973, now abandoned.

The present invention relates to a conveyor of the type comprising an endless main conveyor belt made as a train of consecutive belt links each constituted by a conveyor element having transversely arranged endless conveyor belt means operable to be moved in the cross direction of said main conveyor belt in order to effect unloading of articles from the main conveyor at at least one unloading station passed by the main conveyor belt, said cross conveyor belt means being driven by driving means located individually on each conveyor element and having a power transfer device such as a pinion adapted to be operated by moving engagement with elongated actuator means such as tooth rack associated with the chassis of the main conveyor. A conveyor of this type is disclosed in our copending patent application Ser. No. 270,030, now abandoned and in the U.S. Pat. No. 3,231,068 and is usable as a sorting conveyor, the main belt passing a loading station in which articles such as post parcels or flight luggage are placed on the belt whereafter the belt moves past a number of unloading stations, in which the different articles are selectively unloaded or diverted laterally from the belt according to the individual destinations of the articles, these destinations being defined by a destination code assigned to each article so as to actuate the diverting means in the particular unloading station. Code responsive control systems of this kind are well known in the art and should need no further description at this place.

In order to cause one or more cross conveyor belts to be moved so as to unload an article in a given unloading station it is known to bring the said elongated rack means into an operative position in which they are engaged by a power transferring pinion on each cross conveyor element so that the pinion is rotated during the passage of the unloading station, whereby the cross belt is moved so as to unload the article. If the cross conveyor elements are closely juxtapposed the pinion of the next element may engage the rack before the first pinion has completed its rolling along the rack, i.e. before the rack can be shifted to its inoperative position, and in that case the next cross belt would start moving until the rack is shifted. As disclosed in our said copending patent application it is possible to divide the rack means in sections and control their actuation and deactuation in a cascade-like manner, whereby one or more elements may be operated during the passage of an unloading station, without the preceding and following elements being operated, but this control system is rather complicated.

It is the purpose of this invention to provide a conveyor of the type referred to, in which the power transmission to the cross conveyor belts is controllable by simple means in such a manner that the cross belts of the consecutive elements are individually operable during passage of an unloading station.

The conveyor according to the invention is characterised in that in the driving connection between the actuator means and the cross conveyor belt means of each conveyor element there is provided a coupling means operable to be shifted between a power transferring position and a disengaged position, and in that adjacent each unloading station there is provided a coupling actuator which is selectively shiftable between an active position in which when passed by a cross conveyor element it causes said coupling means of the element to be brought into said power transferring position, and an inactive position in which it allows the coupling means of the passing elements to remain in their disengaged positions, deactuation means being provided after each or after all unloading stations for shifting the actuated couplings back to their disengaged positions. In this construction the rack means may be stationarily mounted in rigid connection with the conveyor chassis, i.e. they shall not have a moving or shifting mechanism which should moreover withstand the reaction forces of the driving engagement between the rack and the pinions, and the only shifting to be effected is that of the said coupling actuator, the shifting being done preparatory to the particular element entering the unloading station. The coupling actuator is easily shiftable between the passage of two consecutive elements and thus the cross conveying belts will be individually operable in an easy manner.

According to a preferred embodiment of the invention the driving pinion of each element is mounted at the outer end of a shaft which is laterally swingable between an active position, in which the pinion will be engaged by the rack, and an inoperative position in which the pinion passes along the rack without being engaged thereby, i.e. in this case the said coupling means and the said power transfer means are identical, and the construction can be made extremely simple.

Figure 2:
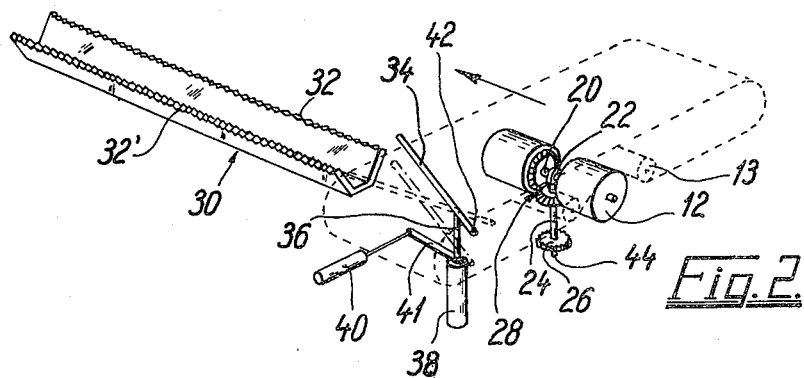
Figure 3:
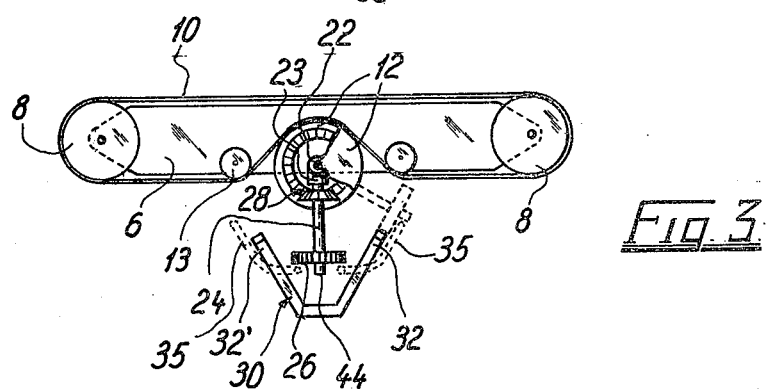
Figure 4:
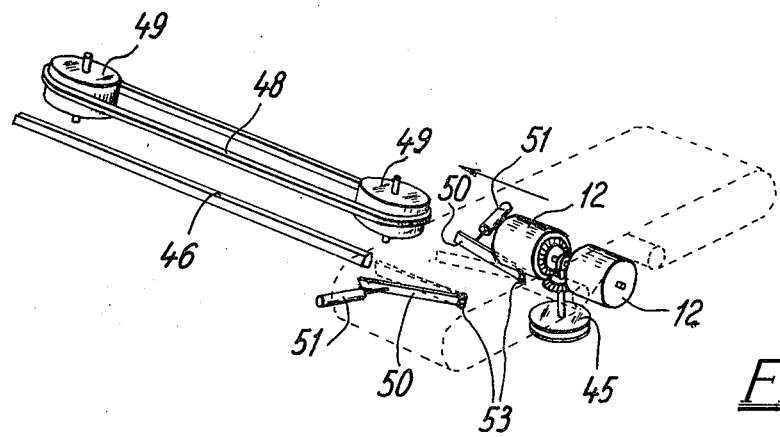
Figure 5:
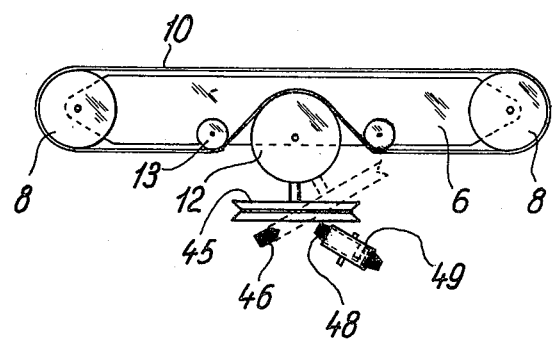

The invention is described in more detail in the following with reference to the accompanying drawings, in which:

FIG. 1 is a perspective view of a section of the main conveyor belt in a conveyor according to an embodiment of the invention FIG. 2 is a schematic perspective view of the driving means of the cross conveyor belts, FIG. 3 is an end view of the driving means shown in FIG. 2, FIGS. 4 and 5 are views corresponding to FIGS. 2 and 3, respectively, of a preferred embodiment of the driving arrangement, and FIGS. 6–9 are corresponding views of still further embodiments.

In FIG. 1 there is shown a partial length of the upper run of a main conveyor belt 2 made of a number of juxtapposed belt links 4 each constituting a cross conveyor element comprising a chassis structure 6 having opposed end guiding rollers 8 for a conveyor belt 10 the lower run of which passes above a roller 12 so as to be in driving engagement therewith. This arrangement is shown more clearly in FIGS. 2 and 3. Closely outside of the sides of the belts 10 each chassis 6 is provided with downwardly extending support legs 14 provided at their lower ends with supporting wheels 16 which are rollingly engaged in stationary, longitudinal C-rails 18 so as to support the belt 2 in an easily movable manner. The belt 2 is an endless belt which is driven around end sprockets (not shown) in any suitable manner; in order to be able to pass these sprockets the elements 4 should be connected to each other in a mutually pivotal manner, but it is not the purpose of the invention to describe this arrangement in further detail; the arrangement may be as disclosed in our said copending application.

As shown in FIG. 2 the roller 12 is divided into two outer portions between which there is a space traversed by the roller shaft 20. This shaft passes freely rotatably through a bushing 22 carrying a rotatable, downwardly extending shaft 24 which is adjacent its lower end provided with a pinion 26. A bevel gear 28 is provided between the shaft 24 and the shaft 20.

In each unloading station of the main conveyor there is rigidly mounted a tooth rack member 30, FIGS. 2 and 3, having a tooth rack 32 in the right hand side and a tooth rack 32' in the left hand side. These racks are situated so as to be able to support and engage the periphery of the pinion 26 when the shaft 24 has been swung out to one of the sides, as most clearly shown in FIG. 3, and it will be noted that the pinion will thereby be rotated in opposite directions by cooperation with the racks 32 and 32', respectively. However, if the pinion has not been swung up to one side before it enters the area of the rack member 30 it will pass this member without being engaged for rotation.

In order to selectively actuate the pinion 26 there is arranged a guiding rod 34 immediately in front of the rack member 30, this rod being movably supported on the piston rod 36 of a stationary vertical cylinder 38, the piston rod being rotatable by means of a horizontal cylinder 40 having its piston rod connected to the outer end of a lever 41 projecting radially from the piston rod 36 and connected therewith in a non-rotatable manner. In its raised position the front portion 42 of the guiding rod 34 will be engaged by a lower extension 44 of the pinion shaft, and the rod is inclined so as to cause the shaft 24 to swing outwardly to one side until the pinion 26 engages the rack portion 32. As shown in dotted lines the guiding rod 34 may guide the pinion to the rack portion 32' if the cylinder 40 has been operated so as to swing out the rod 34 towards the left. In a lowered position as shown in dash-and-dot lines the guiding rod 34 will not be engaged by the shaft portion 44, and the pinion will pass between the two rack portions without being rotated.

When the pinion has been swung out to one of the sides the support of the pinion will be taken over by the respective rack 32 or 32', and the particular cross belt 10 will be moved as long as the pinion rolls along the rack. The rack is long enough to ensure that the cross belt will be moved a distance corresponding to the width of the main belt 2. The rotation of the pinion is stopped automatically when the pinion leaves the rack and thereby swings back to its inoperative position.

The guiding rod 34 may be raised as soon as the pinion of an element 4 has passed it, i.e. before the pinion of the next element reaches the rod 34, and it may be maintained raised as long as it is desired to actuate the cross belts of consecutive elements, e.g. in order to unload an article resting on more than one of the elements 4. When the last of these elements or just a single element has passed the rod 34 this rod may be lowered before it is engaged by the pinion shaft of the following element, i.e. the elements will be fully individually actuable.

FIGS. 4 and 5 show a modified and in practice preferred embodiment in which the pinion 26 is substituted by a grooved pulley 45 cooperating with a friction rack 46; as shown at 48 it may be practical to use an ordinary V-belt which is easy to secure at the ends by means of fixed pulleys or cylinders 49. As shown, the grooved pulley need not be swung out very far in order to secure a firm driving connection. Instead of the guiding rod 34 there is at each side used a smooth guiding member 50 which is swingable about a rigid shaft 53 between a retracted position outside the path of movement of the pulley 45 and an operative position in which it is slidingly engaged by the outer periphery of the pulley so as to guide this portion of the periphery inwardly-downwardly into engagement with the rack 46 or 48. The guiding members 50 are individually operable by means of cylinders 51.

Figure 6:
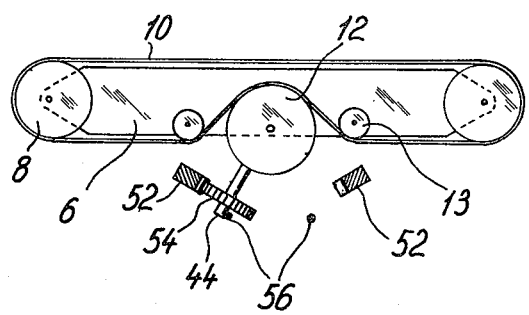

In the embodiment shown in FIG. 6 the rack means 52 are adapted to cooperate with the exterior side of the periphery of the swung out pinion 54; the operative position of the pinion is maintained by means of elongated support means 56 for the abutment 44.

When the pinion 26 or 45 rolls on the rack means there is transmitted a rotary moment to the roller 12, and the reaction moment acts on the shaft 24 so as to tend to swing this shaft about the shaft 20. Preferably the arrangement is made in such a manner that the reaction moment tends to swing the shaft 24 in a direction causing the pinion 26 or 45 to be pressed against the rack, whereby the rack takes up the reaction forces and whereby a safe engagement between the rack and the pinion is ensured even in case of a pure frictional engagement as illustrated in FIG. 4. It will be noted that the bevel gears shown in FIGS. 2 and 4 will not operate in this manner unless the direction of movement of the main conveyor belt is reversed, or unless the roller part of the gear is mounted in connection with the opposed half of the roller 12.

It will be appreciated that one of the main features of the invention is that the cross conveyor elements are provided with driving means or driving connection establishing means which may be actuated by passage of an actuation means assuming a selected position in accordance with the destinations of the articles.

As shown in FIG. 7 the driving pinion may be substituted by sliding shoes 60 for cooperating with current rail rack means 62 in order to energize a driving motor 64 mounted in each element for driving the belt 10. As exemplified by FIG. 7 the driving connection to the belt 10 may be established through a driving belt 66 passing around the motor pulley and around a driving roller 68 for the belt 10, this roller having an annular groove 70 in which the driving belt 66 is received so as to not project outside the roller surface along the circumferential length occupied by the conveyor belt 10. The sliding shoes 60 are mounted on a laterally swingable, but otherwise rigid shaft 72 corresponding to the pinion shaft 24 of FIGS. 1–3, and it will be understood that this shaft or rod may be caused to be swung to one side or the other just as described in connection with the swinging of the shaft 24 of FIGS. 1–3, whereby it will be brought into contact with one of two opposed current rails 62 corresponding to the racks 32 and 32'. The shaft 72 carry sliding shoes at both sides, and these are connected to the motor 64 so as to cause the motor to run in opposed directions depending of the side to which the shaft is swung out.

In the embodiment shown in FIG. 8 one set of the supporting wheels 16 are used for driving the cross conveyor belt 10 by way of an intermediate gear box 76 having actuator means operable to establish the driving connection. The wheels 16 are mounted rigidly on a shaft 78 which passes through the gear box 76, this box being mounted on a pair of traverses 80 extending between the side panels of the element chassis. From the gear box there projects a rotary shaft 82 upwardly, this shaft having a pulley 84 which is connected to a driving roller 88 for the conveyor belt 10 by means of a belt 86, in a manner similar to the driving engagement between the roller 68 and the belt 66 in FIG. 7. However, the belt 86 is turned 90° in order to connect the horizontal pulley 84 with the vertical groove in the roller 88. At the lower end of the gear box there is provided a transversely extending gear lever or gear shifting rod 90 which is reciprocally mounted so as to be able to assume a position in which its ends project equally from the gear box to both sides thereof, a position in which it projects farther to one side than to the other, and a position in which it projects farthest to the other side, the shifting rod 90 in a manner not shown being connected with the gear system in such a manner that these positions correspond to an idle run of the wheels 16, clockwise drive of the shaft 82, and counter-clockwise drive of this shaft, respectively.

Adjacent the entrance to each unloading station there is mounted an actuation member 92 at each side of the path of movement of the gear rod 90, each of these members — like the members 50 of FIG. 4 — being shiftable by means of a cylinder 94 so as to either let the gear rod pass in the neutral position thereof or cause the rod to be shifted into one of its gear actuating positions. When actuated in this manner the gear will cause the conveyor belt 10 to be driven during the further movement of the main conveyor belt. At the rear end of the unloading station there is provided a rigid deactuator guiding member 96 at each side of the path of movement of the gear box, these members having forwardly tapering guiding surfaces which, if hit by the projecting end of the gear rod 90, will cause this rod to be pressed back into its neutral position. Thus, in this embodiment the driving power is taken from the frictional engagement between the supporting wheels 16 and the rails 98 along which they are rolling. It will be understood that this kind of actuation of the driving connection to the belt 10 would be usable also if the rod 90 serves to operate electric switch means for energizing the motor shown in FIG. 7.

In FIG. 9 there is shown an embodiment in which basically the same element structure as in FIG. 7 is used, and also the same reference numerals are used. Instead of the swingable sliding shoe rod 72, however, there is used a rigid sliding shoe arrangement 100 being in permanent contact with a current rail 102, though actual current rails, of course, are only necessary along the unloading stations. Adjacent the underside of each element 4 there is mounted a pair of sensor elements 104 and 106 responsive to light signals or other non-mechanical control media, e.g. an induction current. At the entrance to each unloading station there is mounted a signal device 108 having light or other signal media transmitting means 110 and 112 located underneath the path of movement of the sensors 104 and 106, respectively, these transmitters being operable to transmit a control signal when it is desired to cause actuation of the cross conveyor belt 10 of an element entering the unloading station, e.g. to produce an upwardly directed light beam analogous to the guiding rod 34 of FIG. 7 being raised. The sensors 104 and 106, in a manner not shown in detail, are connected to an electric relay unit 114 serving to connect the motor 64 to the gliding shoes 100 in response to one of the sensors being actuated by their passage of the signal device 108. This relay device is adapted to start the motor in one direction when the sensor 104 is actuated and in the reverse direction when the sensor 106 is actuated. In order to stop the motor when the element has passed the unloading station the relay unit may be adapted to be reset to a switched off position in response to the sliding shoes 100 leaving the active current rails along the station, or a variety of other stop methods according to elementary automation control principles can be used.

Finally it should be mentioned that in the mechanically actuated embodiments according to FIGS. 1–6 the movable guiding means 34 and 50 need not extend all the way to the rack means, since as indicated in dotted lines at 35 in FIG. 3 the rear part of the guiding means may be associated rigidly with the rack means in such a manner that for shifting the pinion shaft 24 from its neutral position to one of the sides it will be sufficient to let the movable guiding means 34 swing out the shaft until the shaft is received by the front end of the rigid guiding means 35. In this manner the movable guiding means need not be actuated for any long time, and thus it is ensured that they will not interfere with the pinion shaft of the preceding or following element even if the inclination of the guiding means is small, i.e. the swinging velocity of the pinion shaft is relatively low such as would be desirable.

What is claimed is:

1. Apparatus for controlling unloading of a conveyor of the type including a main conveyor belt movable in a main conveyor direction and formed of a plurality of interconnected conveyor elements which each have cross conveying means operable to be moved in a transverse direction with respect to said main conveyor direction to effect unloading of articles from the main conveyor belt at at least one unloading station adjacent the travel path of the main conveyor belt; said apparatus comprising:

driving track means arranged along said at least one unloading station, driving means located on each conveyor element for driving said cross conveying means in said transverse direction, each of said driving means including power transfer means engageable with said driving track means, power control means on each conveyor element which is shiftable between an active position providing a driving connection between said rack means and driving means by way of said power transfer means and a passive position providing a disconnection of said driving connection, an actuator means at said at least one unloading station, said actuator means being operable in a non-actuating condition out of operative connection with respective power control means on conveyor elements passing the respective actuator means and an actuating condition in operative connection with a respective power control means of a selected conveyor element passing said actuator means to shift said respective power control means from said passive to said active position, and retaining means for retaining said power control means of said selected conveyor element, upon movement thereof to said active position, in said active position at least during the passage of the selected conveyor element through the unloading station, independently of the condition of said actuator means.

2. Apparatus according to claim 1, further comprising returning means for automatically returning said power control means to said passive condition after the passage of the selected conveyor element through the unloading station.

3. Apparatus according to claim 1, wherein each of said cross conveying means is a cross conveyor belt means, and wherein said main conveyor belt and each of said cross conveyor belt means are constructed as endless belts.

4. Apparatus according to claim 3, wherein said driving track means are arranged in a stationary manner along said at least one unloading station and extend parallel to said main conveyor direction.

5. Apparatus according to claim 3, characterized in that the power transfer means of each conveyor element is arranged to be movable in a cross direction relative to the movement of the main belt between an operative position in which it is engageable by said track means when moved therealong, and an inoperative position in which it is unengageable by the track means, the driving connection between the power transfer means and the cross conveyor belt means being effective at least when the power transfer means assumes its operative position, said actuator means being constituted by means for selectively displacing the power transfer means to its operative position, said retaining means including elongated support means for maintaining the power transfer means in this position during the passage of the unloading station.

6. Apparatus according to claim 5, in which each of said power transfer means includes a driving wheel operable to roll along said driving track means, characterized in that the driving wheel of each conveyor element is mounted on the lower end of a shaft hanging down from rotatable drive means of the cross conveyor belt means so as to be laterally swingable relative thereto, said shaft being in driving connection with the rotatable drive means and being operable by said actuator means to be swung from an inoperative position in which the wheel is laterally spaced from said track means to an operative position in which the wheel is engageable by the track means.

7. Apparatus according to claim 6, characterized in that in said operative position of the driving wheel, said driving wheel is movable into contact with the track means so as to be supported by the track means during its movement therealong.

8. Apparatus according to claim 6, characterized in that the driving wheel is a friction pulley which is frictionally engageable with said track means and that the actuator means is a guiding plate which in its active position is engaged by the circumference of the pulley so as to be operable to guide the pulley into driving engagement with the friction track means.

9. Apparatus according to claim 6, comprising on each conveyor element a horizontal rotary shaft mounted crosswise of the cross conveyor belt means thereof, a rotary driving roller driven by said horizontal shaft and drivingly engaging said cross conveyor belt means, a bushing rotatably mounted on said shaft and having a holding bearing for the upper end of said rotary driving wheel shaft, which extends downwardly therefrom, a bevel gear arrangement being provided between said horizontal shaft and said driving wheel shaft, whereby when the driving shaft and therewith the cross conveyor belt means is driven a reaction moment of rotation will be transferred to said driving shaft through said bevel gear and tend to swing the driving shaft laterally together with said bushing about said horizontal shaft, said driving track means being situated at that side of the driving wheel to which the driving shaft and therewith the driving wheel is swung by said reaction moment.

10. Apparatus according to claim 6, in which the driving wheel shaft is selectively swingable from neutral, inoperative position to any of two active positions at opposed sides thereof, and wherein at both sides of the path of movement of the driving wheel shaft through said at least one unloading station there are provided opposed driving track means engageable with the driving wheel in either of said active positions so as to drive the driving wheel in opposite directions, respectively.

11. Apparatus according to claim 1, in which said driving means comprise an electric motor, said driving track means being constituted by electric contact rail means, said power transfer means being constituted by wiper means operable to slide along said contact rail means, said power control means being constituted by means for establishing electric connection from said contact rail means to said motor in response to actuation of said actuator means.

12. Apparatus according to claim 11, in which said wiper means are laterally movably suspended so as to be shiftable between an operative position in which they are engageable with said contact rail means and an inoperative position in which they are unengageable with these rail means.

13. Apparatus according to claim 11, in which the wiper means are mounted in a stationary position on said conveyor element so as to engage with said contact rail means, each conveyor element being provided with switch means cooperating with said actuator means for effectively energizing said driving motor from said wiper means in response to said switch means being actuated by said actuator means.

14. Apparatus according to claim 1, wherein said actuator means includes a member abuttingly engageable with a portion of said power transfer means to move said power transfer means into a position assuring contact of said power transfer means and said track means.

15. Apparatus according to claim 1, wherein each of said cross conveying means is a cross conveyor belt means, wherein each of said driving means includes: a rotatable drive member directly engageable with a respective cross conveyor belt means, a first bevel gear part connected to and rotatable with said rotatable drive member, a second bevel gear part drivingly engaged with said first bevel gear part, and a shaft connected to and rotatable with said second bevel gear part, wherein said power transfer means includes a further rotatable member attached to said shaft at a spacing from said second bevel gear part, said shaft being pivotally mounted for movement between respective positions with said further rotatable member in and out of driving engagement with said track means while maintaining continuous driving contact between said first and second bevel gear parts, and wherein said actuator means includes a movable abutment member engageable directly with said shaft for moving said shaft to assure driving engagement of said further rotatable member with said track means.

16. Apparatus according to claim 15, wherein said track means includes a pair of tracks spaced laterally from one another for accommodating respective opposite transverse directions of movement of said cross conveyor belt means in response to engagement of said further rotatable member with respective opposite ones of said tracks.

17. Apparatus according to claim 15, wherein said track means is a toothed rack and said further rotatable member is a toothed gear.

18. Apparatus according to claim 15, wherein said track means is a friction rail and said further rotatable member is a pulley.

19. Apparatus according to claim 15, wherein said retaining means includes interengaging means on said track means and said further rotatable member for maintaining said track means and further rotatable member in driving connection with one another.

20. Apparatus according to claim 15, wherein said retaining means includes elongated support means engageable with a side of said shaft opposite the respective track means engaged by said further rotatable member.

21. Apparatus according to claim 15, further comprising returning means for automatically returning said power control means to said passive condition after the passage of the selected conveyor element through the unloading station.

22. Apparatus according to claim 21, wherein said main conveyor belt and each of said cross conveyor belt means are constructed and endless belts.

23. Apparatus according to claim 22, wherein said driving track means are arranged in a stationary manner along said at least one unloading station and extend parallel to said main conveyor direction.

* * * * *